US006519586B2

(12) United States Patent
Anick et al.

(10) Patent No.: US 6,519,586 B2
(45) Date of Patent: Feb. 11, 2003

(54) METHOD AND APPARATUS FOR AUTOMATIC CONSTRUCTION OF FACETED TERMINOLOGICAL FEEDBACK FOR DOCUMENT RETRIEVAL

(75) Inventors: Peter Anick, Marlboro, MA (US); Suresh Tipirneni, Waltham, MA (US)

(73) Assignee: Compaq Computer Corporation, Maynard, MA (US)

( * ) Notice: Subject to any disclaimer, the term of this patent is extended or adjusted under 35 U.S.C. 154(b) by 0 days.

(21) Appl. No.: 09/370,639

(22) Filed: Aug. 6, 1999

(65) Prior Publication Data
US 2002/0091661 A1 Jul. 11, 2002

(51) Int. Cl.$^7$ ............................................. G06F 17/30
(52) U.S. Cl. .................. 707/3; 707/4; 707/5; 704/9
(58) Field of Search ............................ 707/3, 4, 5, 513; 704/9

(56) References Cited

U.S. PATENT DOCUMENTS

| | | | | |
|---|---|---|---|---|
| 5,787,421 A | * | 7/1998 | Nomiyama | 707/5 |
| 5,819,260 A | * | 10/1998 | Lu et al. | 707/3 |
| 5,913,215 A | * | 6/1999 | Rubinstein et al. | 707/10 |
| 6,169,986 B1 | * | 1/2001 | Bowman et al. | 707/5 |
| 6,212,494 B1 | * | 4/2001 | Boguraev | |

OTHER PUBLICATIONS

Anick et al., "Exploiting Clustering and Phrases for Context–Based information Retrieval" Proceedings of SIGIR '97, pp. 314–323, 1997.
Bates, Online, "How to use Information Search Tactics Online" pp. 47–54, May 1987.
Meadow et al., "Online Access to knowledge: System Design" JASIS, vol. 40, pp. 86–98, 1989.
Brusa et al, "Query Reformulation on the Internet: Emperical Data and the Hyperindex Search" RIAO '97, pp. 488–499, 1997.
Cooper, "What is Lexical Naligation" et al., Digital Libraries '97.
Grefenstette, "SQLET: Short Query Linguistic Expansion Techniques" RIAO '97, pp. 500–509, 1997.
Nakagawa, "Extraction of Index words from Manuals" Proceedings of RIAO '97, pp. 598–611.
Pollitt, "The Key Role of Classification and Indexing in View–Based Searching" Proceedings of IFLA, Copenhagen, Sep. 1997.
Ruge et al, "A Hyperterm System Based on Natural Language processing" International Forum on Information and Documentation, 15(3):3–8, 1990.
Strzalkowsi, "Building a Lexical Domain Map from Text Corpora" Proceedings of COLING '94, pp. 604–610, 1994.
Tseng, "Multilingual Keyword Extraction for Term Suggestion" Proceeding of SIGIR '98, pp. 377–378, 1998.
Turney, "Extraction of Keyphrases from Text: Evaluation of four Algorithms" ERB–1051, National Research Council Canada, 1997.

* cited by examiner

Primary Examiner—John Breene
Assistant Examiner—Khanh Pham
(74) Attorney, Agent, or Firm—Cesari and McKenna, LLP; Michael R. Reinemann (57) ABSTRACT

Iterative information retrieval from a large database of textual or text-containing documents is facilitated by automatic construction of faceted representations. Facets are chosen heuristically based on lexical dispersion, a measure of the number of different words with which a particular search expression co-occurs within a given type of lexical construct (e.g., a noun phrase) appearing in the document set. Words having high dispersion rates represent "facets" that may be used to organize the documents conceptually in accordance with the search expression, effectively providing a concise, structured summary of the contents of a result set as well as presenting a set of candidate terms for query reformulation.

21 Claims, 4 Drawing Sheets

METHOD AND APPARATUS FOR AUTOMATIC CONSTRUCTION OF FACETED TERMINOLOGICAL FEEDBACK FOR DOCUMENT RETRIEVAL

FIELD OF THE INVENTION

The present invention relates to automated document searching, and in particular to the introduction of conceptual/terminological structure to a document set based on textual content.

BACKGROUND OF THE INVENTION

The exponential growth of the Internet has provided consumers with the ability to access vast quantities of information—so much, in fact, that guiding consumers to the information they desire is now an industry. Commercial "search engines" such as ALTAVISTA, accessible over the Internet, maintain massive databases of Internet-accessible documents and accept user queries to search these documents.

The search engine may maintain the documents in an unstructured form, in which case the user searches by "keyword." Essentially, the search engine accepts one or more words that the user considers relevant to the topic of interest, and electronically identifies documents containing the entered words. Search sophistication can be increased by means of Boolean capability, which allows the user to concatenate search terms into strings in accordance with operators such as AND and OR. In practice, it is found that simple keyword queries, while easily composed, tend to underspecify the set of desired documents (retrieving large numbers of irrelevant documents). Such problems arise from the user's lack of knowledge of the subject matter giving rise to the information need, unfamiliarity with the underlying document collection and its content with respect to that need, and the difficulty of translating even a well-defined need into an effective linguistic formulation.

Current search interfaces typically offer a query-refinement loop that allows the user to enter the initial search expression, evaluate the results returned, and then modify the query by addition of keywords. Evaluating search results can be a time- and energy-consuming task, however. In surveying a potentially long list of titles and document summaries, the user must not only evaluate the likely relevance of the retrieved documents, but also assess the likelihood that the database will eventually be able to satisfy the information need (or part of it); assess the degree to which the current query formulation has expressed the need; learn about the information space and the vocabulary used to describe the domain within this particular database; and ultimately decide on an appropriate query reformulation strategy to the extent necessary.

To help the user focus his or her search without this kind of extensive analysis, the documents may be organized according to content, allowing the user to browse through a category of documents or at least to confine a keyword search within such a category. "Clustering" techniques are frequently employed to categorize related documents within a document corpus. But generating the categories and placing the documents within them is an arduous task. Clustering can, for example, be accomplished manually, with each document being individually examined by a clerk who assigns it to the proper category. Naturally, this approach is prohibitive for commercial Internet search engines that store millions of documents.

Clustering can also be performed automatically. "Bottom-up" and "top-down" clustering techniques utilize algorithms that generate a hierarchical category structure and assign each document to one or more categories. These techniques are computationally demanding, however, and do not necessarily generate document categories that ultimately prove meaningful to users.

Another approach to providing users interactive feedback to assist searching is to display terminology "relevant" to the search. The difficulty here is two-fold, first determining which of the thousands of potentially related terms are likely to be most useful in this instance for query reformulation and, second, arranging those terms in some way that helps to elucidate the search space. A manually constructed thesaurus or a database of term-to-term correlations derived from statistical corpus analysis can be used to identify terms that are semantically or statistically related to terms in a user's query expression. Alternatively, a result list can be analyzed at run-time for frequently occurring terms or for phrases containing query terms. In most cases, the terms are simply presented as an unstructured list (perhaps ordered alphabetically or by frequency).

DESCRIPTION OF THE INVENTION

BRIEF SUMMARY OF THE INVENTION

The present invention facilitates searching by extracting, from a collection of documents within a corpus, terms representing key informational concepts (herein referred to as "facets" of the document collection). When the user performs a keyword or other conventional search, the facets pertaining to the documents retrieved by the search are returned to the user along with the documents (which are generally presented in summary form in a results list). The facets may be used directly to refine the search, but also serve to educate the user about the information content of the document corpus and the result list as these relate to the information need.

The invention constructs "faceted" representations of documents by identifying a set of lexical dimensions that roughly characterize concepts likely to have informational relevance. It is found that lexical items signifying key concepts within a domain often tend to co-occur with other useful concepts within certain syntactic contexts, such as noun phrases. Consequently, facets are chosen heuristically based on "lexical dispersion," a measure of the number of different words with which a particular word co-occurs within such syntactic contexts. The greater the level of dispersion—i.e., the more different words with which the given word appears in the documents within the allowed syntactic context—the greater is the likelihood that the given word (along with the lexical constructs in which it occurs) will represent a useful conceptual category relevant to the query topic. The facets and their corresponding lexical constructs effectively provide a concise, structured summary of the contents of a result set as well as a set of candidate terms for iterative query reformulation.

Accordingly, in a first aspect, the invention comprises a method of selecting and organizing documents from a document corpus in response to a user-provided search expression. Preferably, the document corpus is first analyzed to identify potential facets; this is accomplished by searching the textual content of the documents for lexical constructs conforming to a selected syntactic pattern, such as a noun phrase. The lexical constructs, in turn, are examined at query time to derive dispersion rates for words within the constructs. The dispersion rates are assumed to indicate the conceptual relevance of the words to which they relate, and these words are ranked in accordance with their dispersion rates.

The user's conventional search is processed in the usual fashion, returning to the user a list of documents conforming to the search criteria. The user also receives a list of the facets contained in the retrieved documents. The facets, and the lexical constructs within which they appear, may be used for query reformulation in various ways. The user may, for example, recognize a particular construct as especially relevant to the information need and choose to see a list of documents containing this lexical construct. Alternatively, the user may choose to augment the original search expression with a selected word or lexical construct.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE PREFERRED EMBODIMENTS

The present invention exploits the recognition that in English, as in other languages, new concepts are often expressed not as new single words, but as concatenations of existing nouns and adjectives. While this tendency is especially noticeable in technical language, where long chains of nouns ("central processing unit," "byte code interpreter") are not uncommon, compound terms permeate everyday language as well. Noun compounds are regularly used to encode ontological relationships—"oak tree," for example, specifies a type of tree—as well as other kinds of relationships: in the term "tree rings," rings are a property of the tree; in "tree roots," the roots are a part of the tree. One would therefore expect documents dealing with trees to contain many different phrases with the word "tree," since such compounds linguistically serve to identify subordinate categories, attributes, and other relationships within the domain of trees.

The present invention exploits the observation that a word's "lexical dispersion"—i.e., the number of different terms with which the word appears within certain syntactic constructions—can be used to identify key concepts, or "facets," of the document set. In a representative application, the invention is implemented in an interface to a document search engine facilitating document searching and browsing on the World Wide Web (hereafter "web"). More generally, the invention is useful in a broad range of information-processing tasks, including data mining, information filtering, and targeted document retrieval. As used herein, the term "document" includes virtually any digitally stored item having textual content (e.g., items such as articles, papers, statements, correspondence, etc., whose content is exclusively verbal, or mixed-format items such as illustrated books or labeled images that contain only some searchable text).

1. System Organization and Operation

Figure 1:
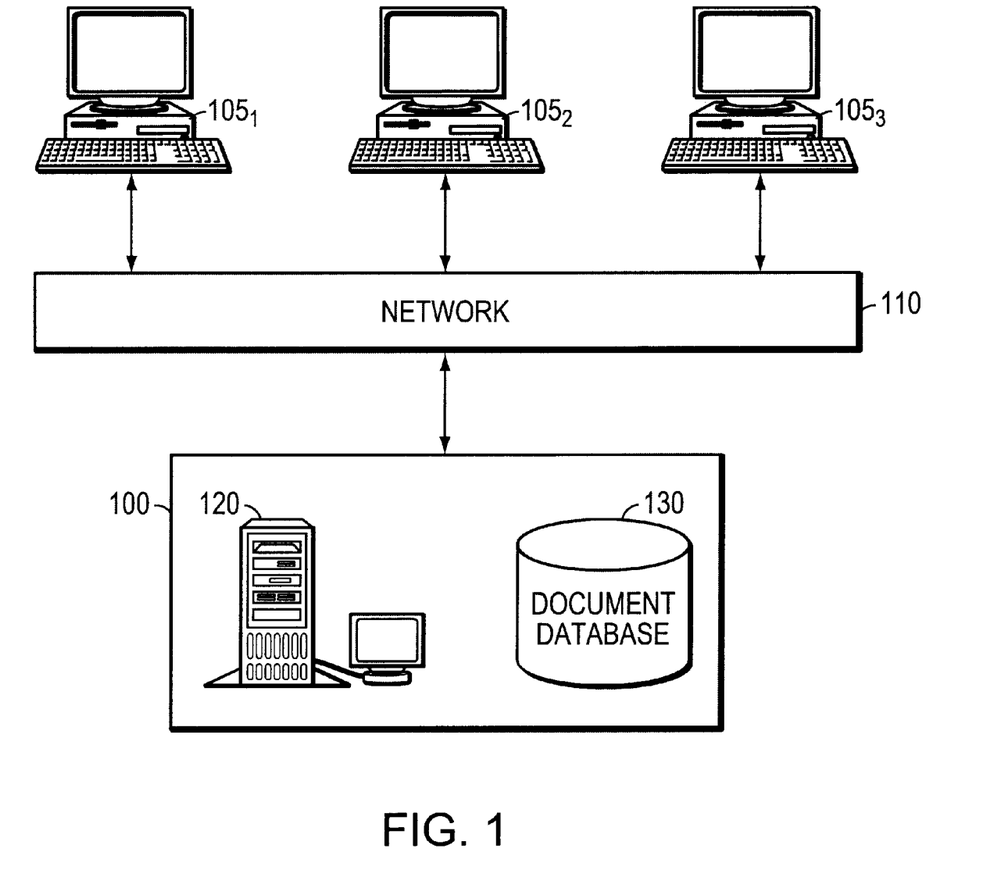
FIG. 1 schematically illustrates a representative environment for the present invention.

With reference to FIG. 1, an exemplary environment in which the present invention is implemented comprises a search engine 100, which is accessible to any of a series of client computers representatively indicated at $105_1$, $105_2$, $105_3$ communicating with search engine 100 over a computer network 110. Search engine 100 comprises a server computer 130 coupled to a large storage device 130, which maintains the searchable document corpus or database. The terms "server" and "host" are herein used interchangeably to denote a central facility consisting of a single computer or group of computers that behave as a single unit with respect to the clients 105. In order to ensure proper routing of messages between the server 120 and the intended client, the messages are first broken up into data packets, each of which receives a destination address according to a consistent protocol, and which are reassembled upon receipt by the target computer. A commonly accepted set of protocols for this purpose are the Internet Protocol, or IP, which dictates routing information; and the transmission control protocol, or TCP, according to which messages are actually broken up into IP packets for transmission for subsequent collection and reassembly. TCP/IP connections are quite commonly employed to move data across the Internet.

Figure 2:
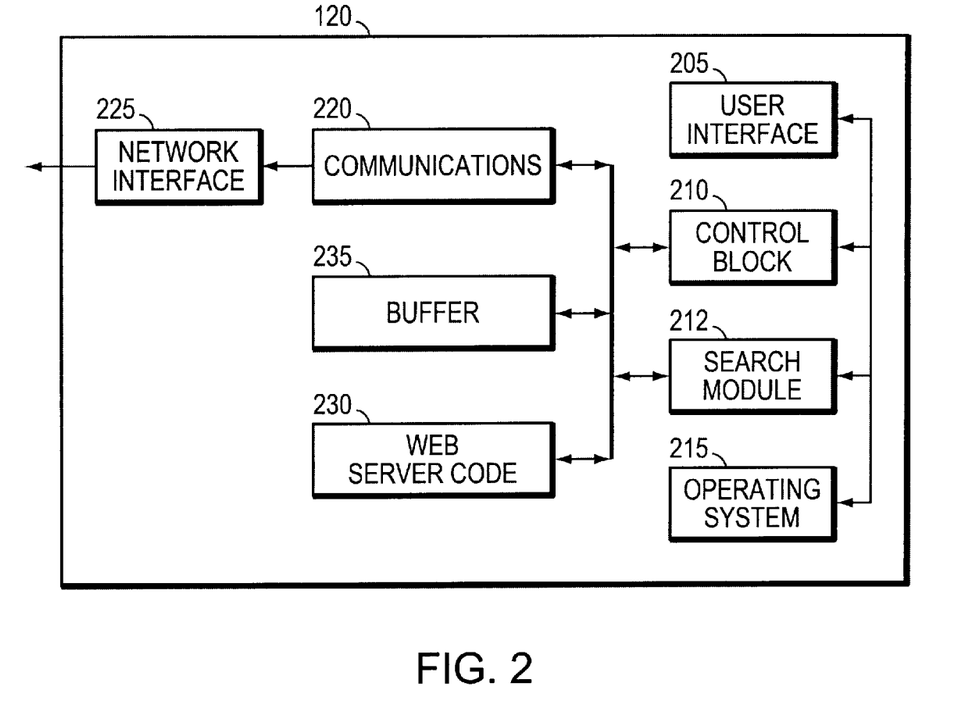
FIG. 2 schematically illustrates a server configured for operation in accordance with the present invention.

FIG. 2 depicts the internal organization of server 120 as a series of functional blocks or modules that implement the functions performed by the server. A user interface module 205 permits the server's operator to interact with and program the server. A control block 210 contains computer-executable instructions for implementing the analytical functions of the invention as described in greater detail below. A conventional search module 212 performs keyword or other conventional searches on document database 130 in response to user-provided queries. The server's operating system 215 directs the execution of low-level, basic system functions such as memory allocation, file management and interaction with document database 130 (FIG. 1). A network communication block 220 provides programming to connect with computer network 110, which may be a local-area network ("LAN"), a wide-area network ("WAN"), or the Internet. A communication module 220 drives a network interface 225, which contains data-transmission circuitry to transfer streams of digitally encoded data over the communication lines defining network 110.

In the case of Internet connections, data exchange with a user (or simultaneously with multiple users) is typically effected over the web by means of web pages. In this case server 120 contains a series of web page templates, which are implemented as formatting (mark-up) instructions and associated data, and/or so-called "applet" instructions that cause a properly equipped remote computer to present a dynamic display. Management and transmission of a selected web page is handled by a web server module 230, which is conventional in the art.

During a search operation, document text and/or index data is rapidly cycled in and out of a memory partition or buffer 235 in accordance with the user's search query and the operation of the invention. Typically, the user does not interact directly with server 120, but instead with an application running on a client machine 105. In this sense, the term "application" denotes a body of functionality for obtaining, processing and/or presenting data to a user. As noted above, the server may support web communications via the HyperText Transfer Protocol (http), formatting web pages that it serves over the Internet to clients 105 contacting the server by means of a web browser. Using conventional CGI scripting and image-map techniques, the web page permits a remote user to make selections and submit queries based on graphical representations; the user selects elements of the graphical web-page display using a position-sensing device (typically a mouse), and the web page communicates the selection (actually, the two-dimensional coordinates of the selection) and text to the server 120.

Figure 3A:
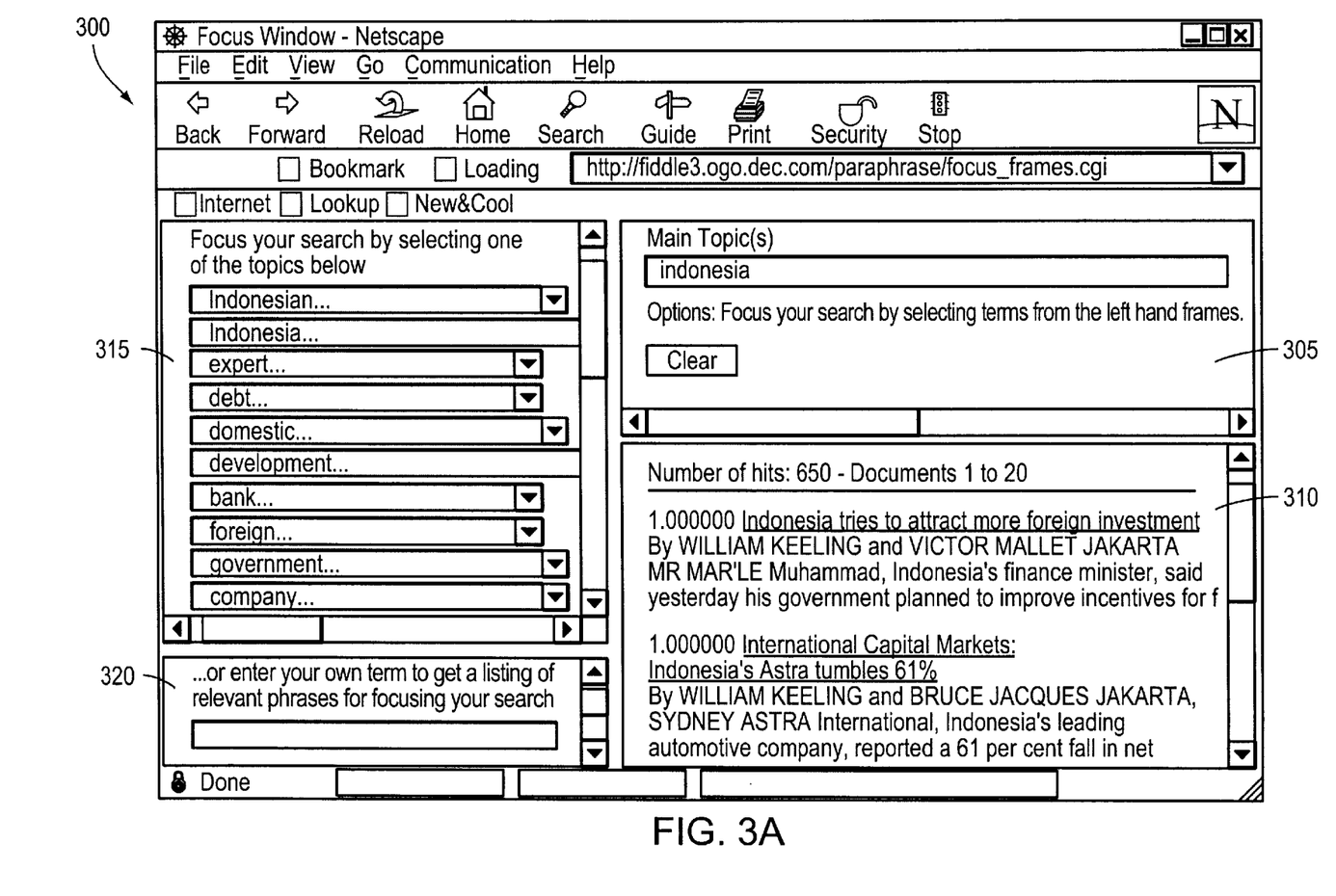
FIGS. 3A and 3B are screen displays illustrating the operation of a preferred embodiment of the invention.
Figure 3B:
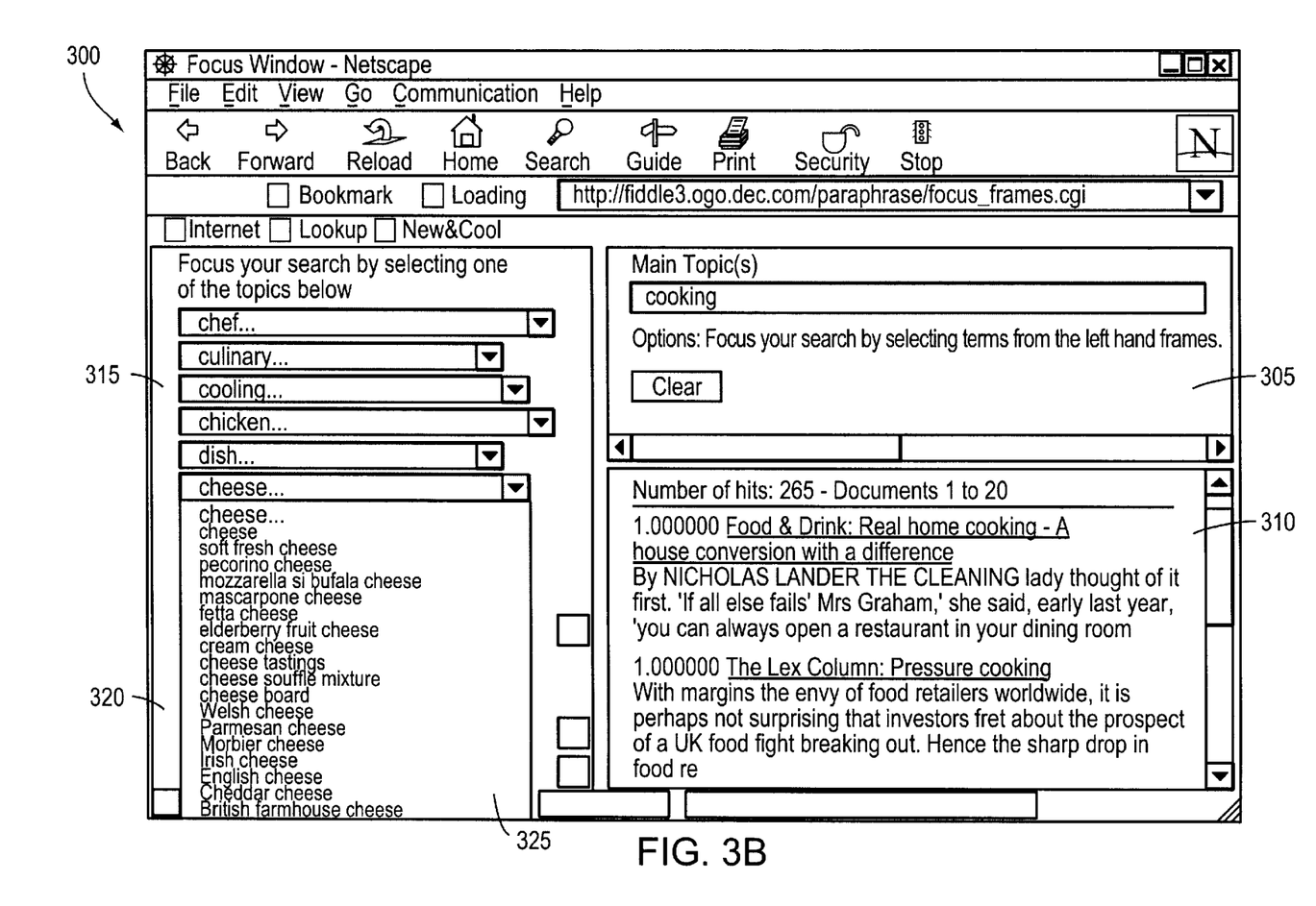

The manner in which server 120 processes a search query is best understood with reference to FIGS. 3A and 3B, which illustrate representative screen displays generated by the present invention and viewed by a remote user. In particular, a web browser (such as the COMMUNICATOR broswer supplied by Netscape Communications Corp. or the EXPLORER browser from Microsoft Corp.), indicated generally at 300, runs as an active process on a client machine 105 (FIG. 1). The web page generated by server 120 and viewed by the user over browser 300 comprises a series of four frames 305, 310, 315, 320. Frame 305 is a text box in which the user may enter natural-language queries for processing by the invention. Below that, results are displayed in frame 310. Frames 315, 320 display terminology. Scrollable upper frame 315 contains a predetermined number (10 in the illustration) of select boxes, each labeled with a facet. As shown in FIG. 3B, clicking the arrow on the right side of a select box causes it to expand into a frequency-sorted menu of phrases containing the facet.

FIG. 3A shows a representative screen resulting from the user's submission of the search query "Indonesia." The items listed in window 310 are identified by server 120 according to a conventional keyword search process through the contents of database 130. The facets presented in box 315 are obtained by control block 210 (FIG. 2) based on lexical analysis of the located documents listed in box 310. In other words, the user's query drives a conventional, coarse search through the document corpus; and lexical analysis of the thus-located documents provides the facets available in box 315. As described in greater detail below, operational preference generally dictates performing the lexical analysis on the entire document collection (e.g., before queries are accepted or during system down time) and not each time documents are located by the coarse search. A mapping between documents and facets is retained, however, so that the facets presented to the user do, in fact, derive from the documents located in response to the query. This approach substantially reduces system response time and avoids duplicative lexical analyses.

With reference to FIG. 3A, the facets corresponding to the located documents summarized in result window 310 are ranked according to lexical dispersion in box 315. The facets include the words indonesian, export, and government, all of which reflect generic topics that occur in a variety of more specific contexts throughout the result list.

FIG. 3B presents the set of contents for the query "cooking." Clicking on the term "cheeses" reveals the phrases listed in the resulting pull-down box 325. These "facet phrases" conform to the lexical construct used to identify the facets and represent the most frequently encountered; of course, the designer can choose (or allow the user to choose) to list any desired number of facet phrases in response to the user's click of a facet selection box. The frequency of a facet's occurrence is preferably measured, as described below, with respect to the documents retrieved in response to the user's query rather than the document corpus as a whole.

While the facets and phrasally associated concepts certainly do not constitute an exhaustive catalogue of the contents of the result list, they are nevertheless conceptually informative, in effect providing a surrogate table of contents from which the user can gain some insight into the subject matter of the result set without wading through the title list or examining sample articles.

The user can respond to the list of facets and facet phrases in several ways. Preferably, the invention is configured to facilitate iterative search by combining a selected facet and/or facet phrase with the original search query. For example, in a preferred approach, the invention allows the user to select a facet phrase from a pull-down list 325, and upon receipt of the user's selection, control block 210 constructs a new query from the concatenation of (1) the original search query, (2) the facet phrase (as a single contiguous term for search purposes), and (3) the individual components of the facet phrase. This approach is especially useful in conjunction with search engines whose ranking algorithms grant rarer terms higher weights, since this will ensure that documents containing the full facet phrase will rise to the top of the result list. By also including components of the phrase in the new query, their individual relevances will contribute to the search results as well.

The user may then select a different facet phrase, in response to which control block 210 replaces the previously chosen facet phrase with a new query based on the newly selected facet phrase, and causes a search to be executed based on the new query. Other modes of query reformulation based on facets and facet phrases are of course possible. For example, the user may select just the facet term itself, which is added to the original search string, imparting greater focus to the reformulated search; or may instead replace the original search expression with the facet term. A new list of facets is not necessarily generated in response to successive search reformulations; retaining the original facet list preserves a stable feedback context across multiple query refinements.

As shown in FIG. 3A, the user may enter a new search expression in box 320. Upon receipt of this term, control block 210 searches the search result list (shown in box 310) for phrases containing the new search expression and conforming to the syntactic pattern used to identify facets. The located phrases (or a subset thereof) are listed in a pull-down list, which the user may select as discussed above with respect to pull-down list 325. For example, in the case of the query "wildlife extinction," a user might enter the word "bill" in box 320 to obtain a listing of legislative bills pertaining to the topic.

2. Facet Identification

As noted above, facets and facet phrases are preferably identified for the entire collection of documents (with new facets identified on an ongoing basis as additional documents are added) in database 130. Key to this process is selection of the syntactic pattern(s) upon which the dispersion analysis is to be based. Control block 210 searches through the documents in database 130 for lexical constructs conforming to this pattern (i.e., instances of the pattern), and performs a dispersion analysis to measure of the number of different words with which a particular word co-occurs within the located lexical constructs.

A large number of syntactic patterns can encode valid semantic relationships. As mentioned above, noun compounds encode strong, long-lived information relating to relationships and attributes, and may therefore serve well as the lexical constructs from which dispersion rates are derived. Another advantage of using noun compounds is the ease with which they may be identified; a pattern matcher scanning a tagged document corpus can readily detect sequences of nouns.

Nonetheless, nominal concepts may be connected by verbs or prepositions, which often express the same relationships encoded in noun compounds. Even simple co-occurrence within a sentence, paragraph, or document often implies some semantic relationship. And not all useful semantic relationships are encoded as compounds; limiting the search to noun compounds may lead to informational gaps.

As adjectives are commonly used to specialize concepts, we have found it useful to also search for noun phrases preceded by an adjective modifier (e.g., "international law" or "ancient history"). This construct also captures compounds formed with the adjectival form of a morphologically related noun (e.g., "French hotel," "literary criticism"). Many nouns and adjectives that frequently occur in phrases have little value for information retrieval, however. A noise-word filter can be used to ensure that such candidate phrases are ignored. Typical filtered terms include quantitative nouns and adjectives, such as cardinal or ordinal numbers; words such as "many," "some," and "amount"; temporal nouns such as "year"; and qualitative adjectives such as "significant" and "reasonable."

In operation, control block 210 first constructs a facet database from document database 130 prior to query-time. Runtime selection of facets and values is performed when a user has entered a query to return a set of facets pertinent to the result list.

Construction of the facet database can be accomplished in accordance with the following steps applied to each document in the collection, which utilizes noun phrases containing at most one adjective to identify facets.

1. Tokenize the document. This refers to separating the text into terms or "tokens" using a set of predefined "delimiters" appropriate to the documents. In the case of English text documents, these delimiters would include spaces, periods, commas, and other punctuation so that each token corresponds to a single word or term.
2. Tag each token with a "part of speech" tag indicating the syntactic category (noun, adjective, preposition, etc.) of each token.
3. Extract all phrases composed of sequences of tokens that match the syntactic pattern ?<adjective><noun>+ and have a total length between 2 and, for example, 5 tokens. In the foregoing formula, the symbol "?" refers to an optional term, so that the formula specifies a single adjective or no adjective. The symbol "+" indicates that more of the preceding term category is allowed, so the formula specifies a phrase containing at least two words the last of which is a noun.
4. Remove any phrases that match a noiseword filter.
5. For each remaining phrase,
    a. if the last term in the phrase (i.e., the head noun) is lower case, then replace it with its morphologically uninflected form. This essentially canonicalizes plural head nouns to their singular forms. For example, "Beethoven symphonies" would be transformed into "Beethoven symphony."
    b. For each term in the canonicalized phrase, create a "facet tuple" in which the first element (the facet) is the term and the second element (the facet phrase) is the full phrase. There is one exception, designed to eliminate facets likely to be first names: if all items in the phrase are capitalized, then the first term of the phrase is not used to compose a facet tuple. However, facet tuples are composed for the remaining phrase elements.
6. Create a file containing the list of facet tuples so created and preserve a mapping between the source document and the corresponding facet file. For example, if each source document is assigned a unique document identifier, then a directory of facet files could be built, with each file named according to its corresponding document identifier. Accordingly, if there is a source file with doc_id 26 containing the text "The jazz band played several long symphonic pieces by Leonard Bernstein," there should be a corresponding facet file containing the following facet tuples:

<jazz, jazz band>
<band, jazz band>
<symphonic, symphonic piece>
<piece, symphonic piece>
<Bernstein, Leonard Bernstein>

Runtime selection of facets and values can be accomplished in accordance with the following steps:

1. Define the following parameters with respect to the ranked document set D computed as the result list for the query Q:
    a. OCC (occurrence cut-off): the number of documents D in which a facet tuple must occur.
    b. DISP (dispersion cut-off): the number of different unique phrases with which a facet occurs within D.
    c. FCAND_DOCS (facet candidate documents cut-off): the number of documents from the ranked set D from which candidate facets are to be extracted.
    d. FVAL_DOCS (facet value documents cut-off): the number of documents from the ranked set D from which facet values are to be extracted.
    e. FFDOC (facets from document cut-off): the number of facet tuples to be considered from any one document. Facet tuples from the beginning of the document up to this cut-off are considered.
    f. FCAND (facet candidate cut-off): the number of facet candidates to consider based on "dispersion" alone.
    g. FFINAL (facet final cut-off): the number of facet candidates to output after ranking by "tf.idf" (i.e, the well-known term frequency/inverse document frequency weighting algorithm, described in greater detail below).
    h. PHR (phrase cut-off): the maximum number of frequency-ranked phrases to be retained for any one facet.
    i. CSIZE (collection size): the number of documents in the total collection (of which D is a subset).
2. For the first FCAND_DOCS documents in the ranked result list D, construct a list of the first FFDOC facet tuples from each of the corresponding facet files.
3. Compute the number of occurrences of each facet tuple in this list and remove those with number of occurrences <OCC.
4. For each facet in this list, compute a frequency-sorted list of the phrases that appear in facet tuples with the facet. The number of different unique phrases occurring for each facet will be referred to as its "dispersion." For each phrase associated with a facet, retain its frequency (i.e., the number of documents in the first FFDOC documents in D in which it occurred) and the phrase itself. So, at this point a list of facet information has been generated in the following form: {facet dispersion {phrase 1 freq} {phrase 2 freq} . . . }
5. Sort the set of facets by their dispersions and retain the top FCAND facets along with their facet information (computed in the previous step). Call this set of facets the "facet candidates."

6. Compute a weight for each facet using a weighting measure. Such a measure should weigh facets more highly if they appear more frequently in the document set D (the "spread" component of the weight) but less frequently in the database overall (the idf component of the weight). Weight measures may be computed as follows:
   a. Method 1 ("dispersion")
      Let weight=dispersion of the facet
   b. Method 2 ("spread")
      Let sp be the number of documents in the first FCAND_DOCS articles of the result list in which a facet tuple for the facet exists
      Let dispersion_limit be a number representing a particular dispersion size (e.g., 5)
      Let weight be computed as sp*100 if dispersion of the facet >dispersion_limit
      Let weight be computed as dispersion if dispersion of the facet <dispersion_limit
   c. Method 3 ("spread.icf")
      Let sp be the number of documents in the first FCAND_DOCS articles of the result list in which a facet tuple for the facet exists
      Let cf be the total number of occurrences of the facet term within the document collection
      Let icf be computed as CSIZE/df
      Let wf1 be an attenuation factor for sp
      Let wf2 be an attenuation factor for icf
      Let weight be computed as $$(wf1+(100*sp/FCAND\_DOCS))*(wf2+\ln(icf))$$

7. Rank the facet candidates by their weight and choose the top FFINAL facets as "facet finalists."
8. For the first FVAL_DOCS documents in D, construct a list of the first FFDOC facet tuples from each of the corresponding facet files for which the facet value of the tuple is one of the facet finalists.
9. For each facet remaining in this list of facet tuples, compute a frequency-sorted list of all the phrases that appear in facet tuples with the facet.
10. Merge this list with the information in the facet finalists. As a result of the merge, each facet will have a new dispersion value and set of phrases. For each facet, sort the set of phrases by frequency and retain the top PHR phrases.
11. Sort the facets alphabetically. Return these facets and their associated phrases.

Changing various parameters can markedly affect the selection of facets. For example, the facet candidate documents cut-off factor can have a significant effect on the eventual facet output; since the result list is ranked (by the search engine's ranking algorithm), the relevance of facets to the query can be increased by limiting the extracted phrases to highly ranked documents. The optimal ranking cut-off may differ from query to query.

The facet candidate cut-off—i.e., the number of top-ranked facet candidates from the first pass to be re-ranked, in accordance with the preferred implementation, by spread.icf—reflects a trade-off between two measures of what consititutes a good facet. On the one hand, a facet should have many phrases associated with it. On the other hand, it should be a term that is particularly relevant to the result set (and not simply a common term throughout the database). Good overall results have been achieved on intranet databases using a facet candidate cut-off value of 50 along with both the spread and the spread.icf ranking strategies.

It is also possible to impose a "line cut-off" value to limit candidate facets to those occurring within the first n lines of a document. This is useful where the collection contains long documents in which topics change, so many of the phrases in the article may be unrelated to the query. A line cut-off is particularly useful in the case of search engines whose ranking strategies favor terms appearing near the beginning of articles, so that query terms are more likely to occur near the front of highly ranked articles. As a result, unrelated phrases may be heuristically eliminated by considering only those appearing in the first n document lines.

The foregoing approach generates facets in two passes. First, lexical dispersion is used to select a set of n (e.g., 50) candidate facets. Then, a ranking measure is used to re-rank the candidates. Spread.icf is a variant of tf.idf, a conventional algorithm commonly used to weight terms based on a combination of their density within a single document (term frequency, or tf) and scarcity within the document corpus as a whole (inverse document frequency, or idf). See, e.g., Salton, "Another Look at Automatic Text-Retrieval Systems, *Comm. of ACM,* 29:7, p. 648–56 (1986), which is hereby incorporated by reference. Applying this weighting has the desired effect of promoting facets that occur more widely throughout the result set, while demoting terms that are too prevalent throughout the corpus as a whole.

It will therefore be seen that we have invented an approach to information retrieval that appears to a user to be conceptually based but is implemented in an automatic fashion; it allows text searchers to refine their searches and become acquainted with the informational content of a document database. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A method of selecting and organizing documents from a document corpus in response to a user-provided search expression, the method comprising the steps of:
   a. locating, within the document corpus, documents matching the search expression;
   b. identifying, within the located documents, instances of a lexical construct conforming to a selected syntactic pattern that includes two or more parts of speech;
   c. assigning dispersion rates to words within the lexical constructs, each dispersion rate corresponding to the number of textually distinct lexical constructs containing the word;
   d. ranking the words in accordance with their dispersion rates;
   e. presenting a list of at least sonic of the words;
   f. facilitating selection of a listed word;
   g. appending the word to a base search expression to form a new search expression; and
   h. facilitating access to documents from the corpus matching the new search expression.

2. The method of claim 1 wherein the base search expression is the user-provided expression.

3. The method of claim 1 wherein the base search expression is a new user-provided expression.

4. A method of selecting and organizing documents from a document corpus in response to a user-provided search expression, the method comprising the steps of:
   a. locating, within the document corpus, documents matching the search expression;

b. identifying, within the located documents, instances of a lexical construct conforming to a selected syntactic pattern that includes two or more parts of speech;

c. assigning dispersion rates to words within the lexical constructs, each dispersion rate corresponding to the number of textually distinct lexical constructs containing the word;

d. ranking the words in accordance with their dispersion rates;

e. facilitating selection of at least one of the words;

f. for each selected word, presenting a sorted list of lexical constructs that appear in the located documents and contain the word; and g. facilitating selection of a listed lexical construct.

5. The method of claim 4 further comprising the steps of:

d. appending the lexical construct to a base search expression to form a new search expression; and e. facilitating access to documents from the corpus that match the new search expression.

6. The method of claim 4 further comprising the step of facilitating access to documents from the corpus that match the selected lexical construct.

7. The method of claim 4 wherein the base search expression is the user-provided query.

8. The method of claim 4 wherein the base search expression is a new user-provided query.

9. The method of claim 1 wherein the syntactic pattern is ?<adjective><noun>+.

10. The method of claim 1 further comprising the step of removing lexical constructs matching a noiseword filter.

11. Text-searching apparatus comprising:

a. a digitally searchable corpus of documents;

b. an interface for receiving a search expression;

c. a search module, responsive to the search expression, for locating documents in the corpus matching the search expression; and d. a control module configured to:
  i. identify, within the located documents, instances of a lexical construct conforming to a selected syntactic pattern that includes two or more parts of speech;
  ii. assign dispersion rates to words within the lexical constructs, each dispersion rate corresponding to the number of textually distinct lexical constructs containing the word; and
  iii. rank the words in accordance with their dispersion rates.

12. The apparatus of claim 11 wherein the user interface is a web page and further comprising:

a. a web server;

b. means for generating web pages for transmission to remote users via the server;

c. means for receiving, via the server, the search expression remotely entered into a generated web page.

13. The apparatus of claim 11 wherein the interface is configured to:

a. present a list of at least some of the words; and b. facilitate selection of a listed word and append the selected word to a base search expression to form a new search expression, the search module receiving the new search expression and, in response thereto, locating documents from the corpus matching the new search expression.

14. The apparatus of claim 13 wherein the initial search expression is the user-provided expression.

15. The apparatus of claim 13 wherein the initial search expression is a new user-provided expression, the interface being configured to receive the new user-provided expression.

16. The apparatus of claim 11 wherein the control module is further configured to:

a. facilitate selection of at least one of the words; and b. present, for each selected word, a sorted list of lexical constructs that appear in the located documents and contain the words, the interface being configured to present the list and facilitate selection of a lexical construct from the list.

17. The apparatus of claim 16 wherein the interface, in response to selection of a lexical construct, is further configured to append the lexical construct to an initial search expression to form a new search expression, the search module being responsive to the new search expression and locating documents from the document database matching the new search expression.

18. The apparatus of claim 17 wherein the initial search expression is the user-provided expression.

19. The apparatus of claim 17 wherein the initial search expression is a new user-provided expression, the interface being configured to receive the new user-provided expression.

20. The apparatus of claim 11 wherein the syntactic pattern is ?<adjective><noun>+.

21. The apparatus of claim 11 wherein the control module is further configured to remove lexical constructs matching a noiseword filter.

* * * * *